US009907292B2

(12) United States Patent
Dudek

(10) Patent No.: US 9,907,292 B2
(45) Date of Patent: Mar. 6, 2018

(54) NECKWEAR FOR PETS

(71) Applicant: Susan Dudek, Cincinnati, OH (US)

(72) Inventor: Susan Dudek, Cincinnati, OH (US)

( * ) Notice: Subject to any disclaimer, the term of this patent is extended or adjusted under 35 U.S.C. 154(b) by 0 days.

(21) Appl. No.: 15/399,253

(22) Filed: Jan. 5, 2017

(65) Prior Publication Data
US 2017/0258050 A1    Sep. 14, 2017

Related U.S. Application Data

(60) Provisional application No. 62/305,712, filed on Mar. 9, 2016.

(51) Int. Cl.
*A01K 27/00* (2006.01)
(52) U.S. Cl.
CPC .......... *A01K 27/006* (2013.01); *A01K 27/001* (2013.01)
(58) Field of Classification Search
CPC .. A01K 27/001; A01K 27/006; A01K 27/008; A01K 27/003; A01K 27/004; A01K 27/005; A01K 27/007; A01K 27/009; A47D 25/00; A47D 25/003; A47D 25/005; A47D 25/006
USPC ....... 119/793, 772, 774, 776, 792, 795, 798, 119/857, 858, 859, 860, 862, 863, 864, 119/865
See application file for complete search history.

(56) References Cited

U.S. PATENT DOCUMENTS

| 623,378 | A | * | 4/1899 | McKee | A41D 25/02 |
| | | | | | 2/151 |
| 927,979 | A | * | 7/1909 | Keys | A41D 25/003 |
| | | | | | 2/145 |
| 1,737,072 | A | * | 11/1929 | Blach | A41D 25/02 |
| | | | | | 2/151 |
| 2,087,620 | A | * | 7/1937 | Lipton | A41F 11/16 |
| | | | | | 2/311 |
| D206,861 | S | * | 2/1967 | Klimkiewicz | D30/152 |
| 3,817,218 | A | * | 6/1974 | Bongiovanni | A01K 27/001 |
| | | | | | 119/856 |

(Continued)

FOREIGN PATENT DOCUMENTS

CA      2812248 A1    10/2013
WO   WO 1997/006672 A1    2/1997

(Continued)

OTHER PUBLICATIONS

International Search Report and Written Opinion dated Mar. 30, 2017 for Application No. PCT/US2017/012320, 9 pgs.

*Primary Examiner* — Monica L Williams
*Assistant Examiner* — Ebony E Evans
(74) *Attorney, Agent, or Firm* — Frost Brown Todd LLC

(57) ABSTRACT

Pet neckwear can be created to close around a pet's neck or to enclose a standard pet collar, so that the apparel may fit to the specific size required by the pet. When used as a cover for a standard pet collar the neckwear may completely cover the collar underneath and yet still allow for leash attachment since it connects through the leash hook instead of over the top of it. The neckwear may be made of materials that can be wiped cleaned or machine washed and may have additional design elements attached in such a way as they could be detached and exchanged for different design elements to form a new style. It is also easy to attach so that even people with dexterity issues such as arthritis can use it to individualize their pet.

3 Claims, 4 Drawing Sheets

(56) References Cited

U.S. PATENT DOCUMENTS

| | | | |
|---|---|---|---|
| 4,266,511 A * | 5/1981 | Muench | A01K 27/006 119/654 |
| 4,939,778 A * | 7/1990 | Tomberlin | H04M 1/15 174/136 |
| 4,999,853 A | 3/1991 | Tanner | |
| 5,109,803 A | 5/1992 | Dunham et al. | |
| D337,133 S * | 7/1993 | Olsen | D21/398 |
| 5,465,689 A * | 11/1995 | Winder | A01K 13/003 119/654 |
| 5,467,743 A | 11/1995 | Doose | |
| 5,794,572 A * | 8/1998 | Saunders | A01K 27/006 119/858 |
| 5,878,698 A * | 3/1999 | Lyell | A01K 27/006 119/863 |
| 6,023,786 A * | 2/2000 | Burnett | A41D 19/02 2/170 |
| 6,339,848 B1 * | 1/2002 | Mayhood | A41F 9/002 2/338 |
| 6,422,177 B1 * | 7/2002 | Noguero | A01K 27/006 119/856 |
| 6,523,182 B1 * | 2/2003 | Brawner | A01K 13/006 2/207 |
| 7,168,394 B2 | 1/2007 | Berry | |
| D542,481 S * | 5/2007 | Katz | D30/145 |
| D576,356 S | 9/2008 | Jennings | |
| D590,568 S * | 4/2009 | Crutchfield | D34/27 |
| D612,551 S * | 3/2010 | Calenda | D30/152 |
| D629,997 S * | 1/2011 | Voga | D2/639 |
| D630,387 S * | 1/2011 | Mendez | D30/152 |
| D649,304 S * | 11/2011 | Cupples | D30/145 |
| D662,266 S | 6/2012 | Dold et al. | |
| 8,286,267 B2 * | 10/2012 | Zuckerberg | A41F 17/04 2/244 |
| 8,474,671 B2 * | 7/2013 | Kelly | B60R 9/08 224/274 |
| 8,668,080 B1 * | 3/2014 | Kazanchyan | A45C 11/16 206/6.1 |
| D703,394 S * | 4/2014 | Bozeman | D30/152 |
| 8,956,635 B2 | 2/2015 | O'Hara et al. | |
| 9,211,458 B2 * | 12/2015 | Kelly | B60R 9/08 |
| 9,472,930 B2 * | 10/2016 | Lake-Maiorana | H02G 3/0462 |
| 2003/0074720 A1 * | 4/2003 | Reed | A41F 9/002 2/322 |
| 2005/0132981 A1 * | 6/2005 | Berry | A01K 27/006 119/856 |
| 2006/0278178 A1 | 12/2006 | Morrison-Gale | |
| 2009/0159016 A1 * | 6/2009 | Lang | A01K 27/006 119/863 |
| 2010/0006039 A1 | 1/2010 | Edwards | |
| 2014/0116356 A1 | 5/2014 | Balenzano | |
| 2016/0066543 A1 * | 3/2016 | Couillard | A01K 27/001 119/864 |

FOREIGN PATENT DOCUMENTS

| WO | WO-9706672 A1 * | 2/1997 | A01K 27/00 |
|---|---|---|---|
| WO | WO 2000/030434 A1 | 6/2000 | |

* cited by examiner

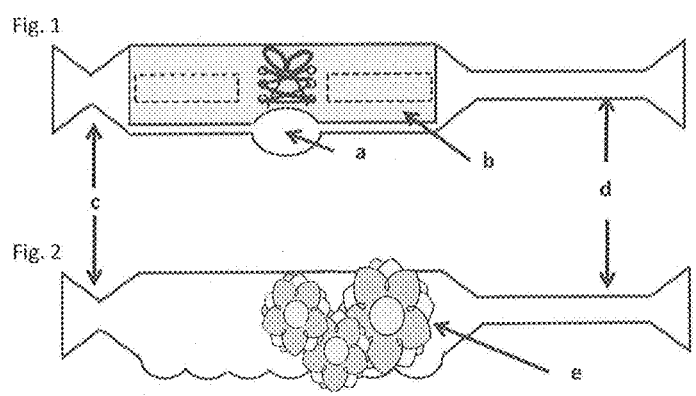
Fig. 1
Fig. 2
Fig. 3
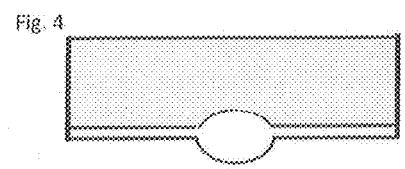
Fig. 4
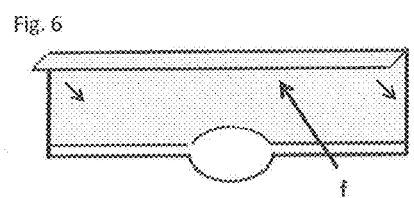
Fig. 5
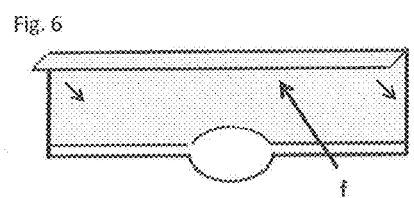
Fig. 6

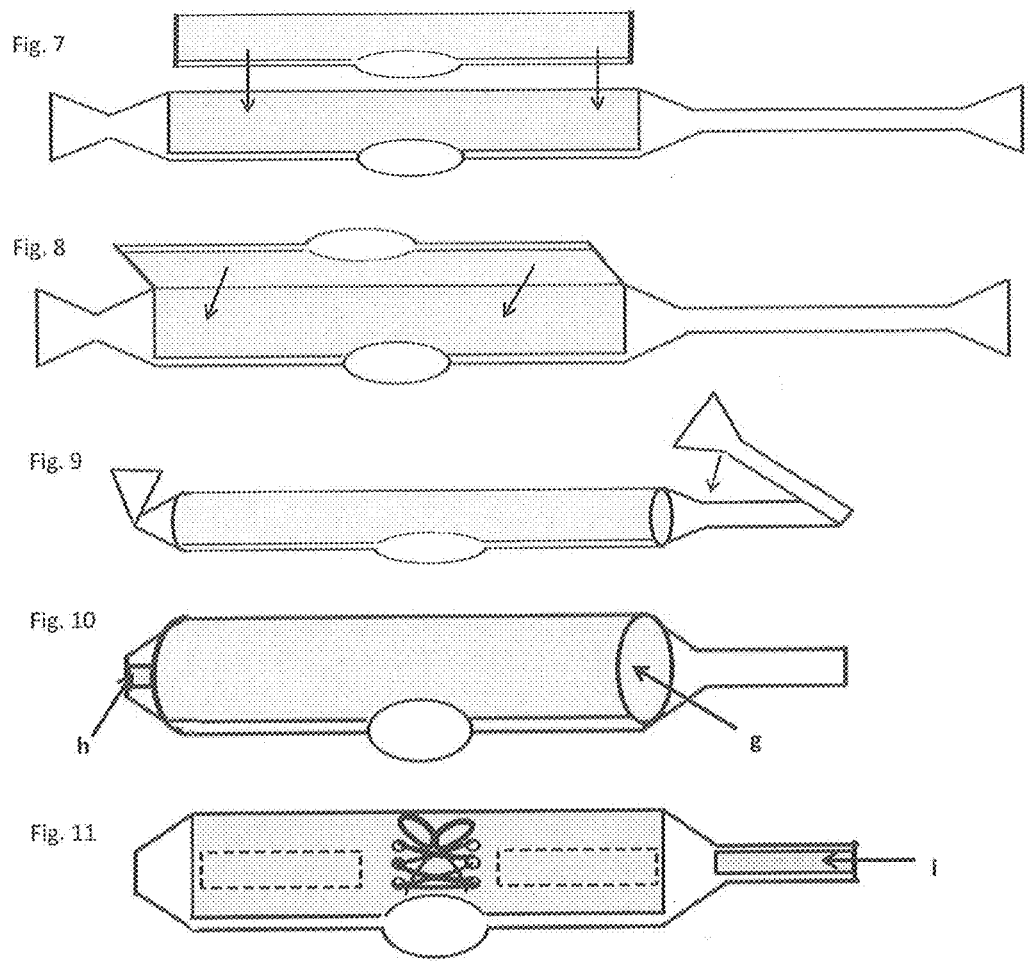

NECKWEAR FOR PETS

CROSS REFERENCE TO RELATED APPLICATIONS

This application is related to, claims priority from, and incorporates by reference in its entirety, provisional patent application 62/305,712, filed on Mar. 9, 2016 and having the same title as listed above.

BACKGROUND

Despite the multitude of specialty pet stores that exist today showcasing various collars for pets, owners continue to search for collar type products that not only allow them to walk and maintain control over their pet, but just as importantly, that allow them to express the unique and individual nature of their favored companion. For many, this precious pet is not just a pet, its family, and owners are searching for collars that allow them to express this. Yet there is little variety or individuality found in options offered by one pet store versus another. Even online shopping offers only minor differences. Collars are basically of the same construction—a single elongated strip of some type of material with a buckle or clasp release type closing. The differences come only in the type of material used to make the elongated strip, or in the pattern or color on the elongated strip. These materials and patterns do not differ greatly from store to store. In addition, the standard collar itself can also cause friction against the neck of an animal, sometimes resulting in loss of hair or rubbing spots on the pet, and once the standard collar and its closing mechanism gets dirty it can be difficult to clean.

Dog collar covers have been designed in response to this desire for uniqueness or for collar protection. Typically they are a piece of fabric of some sort that acts as a kind of sleeve to enclose the collar, thus providing more colors and fabric patterns to choose from. However the mechanism for closing at the ends is either non-existent—the fabric just ends with no way to connect one end to the other; or the type of connecting option is clumsy and not nearly as easy as just connecting the collar itself; or the cover does not completely cover the collar; or the cover has only a few preset size increments to choose from and thus does not fit to the exact size needed. Often the collar itself is visible beneath the cover and thus not fully protected or esthetically pleasing. So although a buyer's range of colors or fabric designs is extended, the cover is many times awkwardly connected to the collar or difficult for an owner to fasten on a fidgeting pet; it does not offer any options other than the typical elongated strip; it cannot adjust to any size required; and it is not seen as a quality or fashionable option. Also, many pet owners do not feel the necessity to keep a collar on their pets while the pet is at home or in a contained environment. Thus a collar cover would be of no use in this circumstance.

Furthermore, standard pet collars can be difficult to fasten for owners with arthritic hands or other dexterity issues. Even the "quick release clasp" isn't always so quick or easy. Collar covers with their various snaps and hooks can also pose a challenge for owners with dexterity issues.

SUMMARY

The disclosed technology may be used to create neckwear for pets comprising a front portion having tapered ends which will either connect to itself, or connect to a back portion or portions, and that when attached may form a type of sleeve that a standard pet collar can slide through. In such neckwear the tapered ends of the front portion may be adapted to attach to each other, may be narrow enough to be threaded through the leash hook on a standard pet collar, and may be flexible enough to adjust to any size required. In such neckwear the body portion may be decorative and may completely conceal a standard pet collar when used as a cover for the collar, or it may easily attach around a pet's neck by itself without the use of a standard pet collar.

The disclosed technology may be used to provide neckwear for pets that may comprise a front section with tapered ends that provide some type of a fastening mechanism, and that can be attached with or without a back section, depending on the design, to form a fashion collar or a cover collar for pets. This type of neckwear may comprise a sleeve type main body section with ends that taper down on one side to an elongated rectangular tab, and that taper down on the other side to a smaller tab. This type of neckwear may also have some type of a fastening mechanism attached on them such that they may be joined together to form the neckwear. Such a fastening mechanism may allow the neckwear to adjust to any neck size as required by the specific pet and/or may connect more easily than the typical buckle or snap type closing mechanism found on a standard pet collar. The front of this type of neckwear may comprise one or more types of different materials attached together to form an irregular shape that may be generally of an elongated rectangular shape with tapered ends that is at least wide enough to cover a standard pet collar, that may have a variety of specialty edges along its length such as scalloped edges or frayed edges or pointed edges, and that may have additional attachments added to the elongated rectangular shape that form a different shape, i.e. adding a bib that would hang down from the front of the elongated rectangular shape such that the final shape becomes more generally square than it is rectangular. Similarly, the front of this type of neckwear may have additional material design elements attached to it for decorative purposes such as ties or pockets, or flowers, or snaps or buttons or any variety of items that one might find on regular clothing for people. In some styles these design elements may be easily exchanged with other design elements as they may have a mechanism, for example a snap, that will allow them to be attached, detached, and exchanged with other design elements as desired. This type of neckwear may be made of materials that can either be wiped clean from dirt, such as vinyl or leather, or from materials that can be machine washed, such as polyester or cotton or canvas.

Objectives which various embodiments could achieve or advance include:

To provide neckwear for pets that may be worn as either a fashion collar itself, or as a cover for a standard pet collar.

To provide neckwear for pets that when worn as a collar cover may completely conceal the standard pet collar underneath.

To provide neckwear for pets that when worn as a collar cover may protect the standard collar from becoming soiled.

To provide neckwear for pets that when worn as a collar cover may still allow for a leash to be attached since it is threaded through the leash hook and not over the top of it.

To provide neckwear for pets that may be used as a collar cover for any type of standard pet collar, i.e. buckle, release clasp, choker, etc.

To provide neckwear for pets that may adjust to the specific size required and that is not restricted to a preset increment as covers with snap or hook closings are.

To provide neckwear for pets with a closing mechanism that is easier to close than a buckle, a quick release clasp or any type of snap or hook type closure, making it easier and quicker to place on a fidgeting pet. For owners suffering from arthritis or other issues that may limit their dexterity, this neckwear may be worn on top of their pet's standard collar.

To provide neckwear for pets that may have design elements that may be easily detached and replaced with different design elements to form a new style.

BRIEF DESCRIPTION OF THE DRAWINGS

The drawings and detailed description which follow are intended to be merely illustrative, and are not intended to limit the scope of protection provided by this or any other document.

FIG. 1 depicts an exemplary design of a front portion of neckwear that could be implemented based on this disclosure.

FIG. 2 depicts an exemplary design of a front portion of neckwear that could be implemented based on this disclosure.

FIG. 3 depicts an exemplary design of a front portion of neckwear that could be implemented based on this disclosure.

FIG. 4 depicts an exemplary back section of neckwear that could be implemented based on this disclosure.

FIG. 5 depicts an exemplary back section of neckwear that could be implemented based on this disclosure.

FIG. 6 depicts an example of how some kinds of material can be hemmed before being attached to other portions of neckwear implemented based on this disclosure.

FIG. 7 depicts the back portion of the neckwear implemented based on this disclosure being attached to that neckwear's front portion when a design with a front and back portion is created.

FIG. 8 depicts how a design with only a front section can be folded in half and then attached together along the bottom.

FIG. 9 depicts tapered ends of a front portion being folded back to form end tabs.

FIG. 10 depicts how a solid sleeve can be created on the backside of neckwear implemented based on this disclosure.

FIG. 11 depicts a front view of one type of design for the completed neckwear.

DETAILED DESCRIPTION

There are numerous ways known for attaching portions of pet apparel and numerous materials to choose from, any of which are compatible with the present description. The diagrams presented along with their descriptions have been provided only by way of illustrative example. Numerous modifications and alternate embodiments of the disclosed technology will occur to those skilled in the art.

Figure 12:
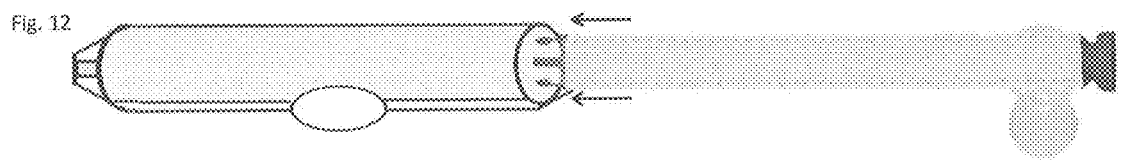
FIG. 12 depicts how a standard pet collar can be slipped through a sleeve portion of neckwear implemented based on this disclosure.
Figure 13:
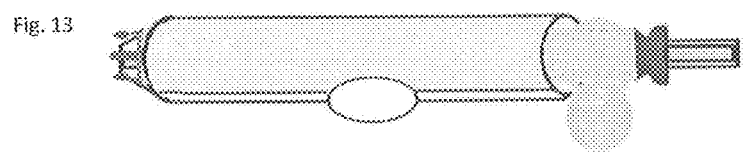
FIG. 13 depicts how a standard pet collar can be slipped through a sleeve portion of neckwear implemented based on this disclosure.
Figure 14:
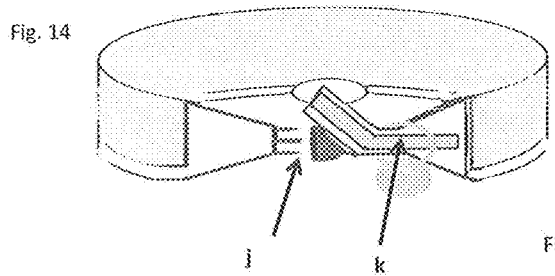
FIG. 14 depicts how a standard pet collar can be attached underneath neckwear implemented based on this disclosure, and a portion of the neckwear can be threaded through a leash hook of that collar.
Figure 15:
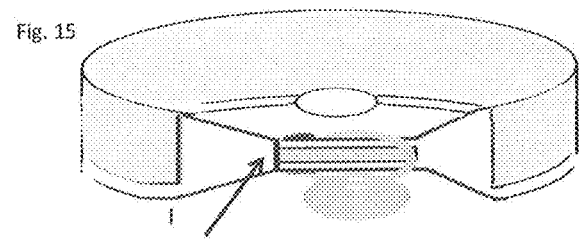
FIG. 15 depicts how neckwear implemented based on this disclosure can be attached together over a standard pet collar.
Figure 16:
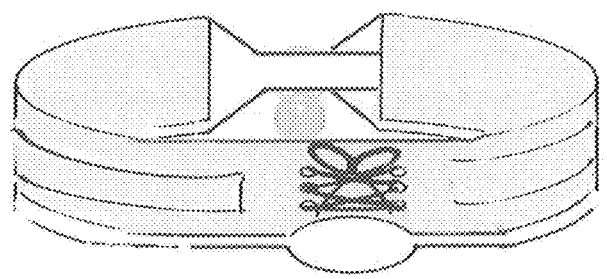
FIG. 16 depicts a front view of one type of neckwear design when it is completely attached without a standard pet collar.
Figure 17:
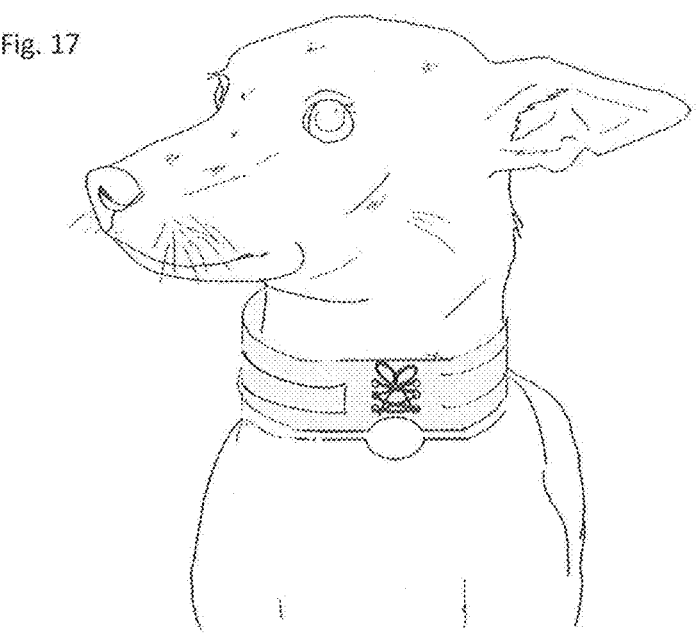
FIG. 17 depicts how neckwear implemented based on this disclosure could be placed on a dog.

FIGS. 1 and 2 and 3 show examples of three different designs for the front portion of the neckwear before the ends have been folded back to form the attaching end tabs. FIGS. 1 and 2 are front portions that will require a corresponding back portion. FIG. 3 is an example of a front portion that will connect to itself to form a type of sleeve without a back portion being needed. FIGS. 4 and 5 show examples of corresponding back sections for FIGS. 1 and 2 that in a preferred embodiment will be solid sections. In alternative embodiments, these back portions could be fabric strips forming loops as in a belt design, or other such configurations. FIG. 6 shows an example of how some kinds of material will be hemmed before being attached to other portions to prevent certain types of materials from fraying. FIG. 7 shows the back portion of the neckwear being attached to the front portion of the neckwear when a design with a front and back portion is created. FIG. 8 shows how a design with only a front section is folded in half and then attached together along the bottom. FIG. 9 shows the tapered ends of the front portion being folded back to form end tabs. FIG. 10 shows how a solid sleeve (g) in this example is created on the backside of the neckwear. In FIGS. 10 and 11 (h) and (i) indicate where the attaching strips or attaching mechanisms will be added to the tabs. FIG. 11 shows a front view of one type of design for the completed neckwear. FIGS. 12 and 13 show how a standard pet collar can be slipped through the sleeve portion of the neckwear. FIG. 14 shows how the standard pet collar (j) would first be attached underneath the neckwear and (k) shows how the neckwear is threaded through the leash hook on the standard collar so the leash hook remains useable. FIG. 15 shows how the neckwear is attached together over a standard pet collar. FIG. 16 show a front view of one type of neckwear design when it is completely attached without a standard pet collar. FIG. 17 shows how the neckwear could be placed on a dog.

Features that may be present in some types of neckwear created based on the present disclosure include:

A front section of material or materials with tapered ends, that may be attached together via various methods and forming an irregular shape that may be longer than it is wider and being referred to as the main body front section.

The main body front section in some designs may be a combination of different materials sewn or attached together to make a specific design. FIG. 1 is an example of a main body front section with a design that is created by sewing two different types of materials together; a vinyl section (a) and a canvas section (b). Additionally on top of the canvas section you will note additional design elements such as strings, eyelets and additional top stitching have been added. FIG. 2 represents another example of a main body front section design that uses only one type of fabric but has an additional material design element attached (e) to form a fabric flower. In some styles the design elements may be removable from the front section in order to replace them with other design elements to form a new style. For example, the flower on the neckwear in FIG. 2 could be attached to the neckwear via a snap such that it could be unsnapped and replaced with a different color flower. FIG. 3 shows another type of configuration for a front section that will not require a back section. The neckwear created based on the current disclosure may have an additional tapered length on each side (c) and (d) that will be used to make the attaching mechanism for the neckwear, hereinafter referred to as the end tabs. In designs created based on the present disclosure one end tab (c) tapers down to a smaller width, and then tapers back out to the same width at which the taper first began, similar to overlapping triangles placed head to head. The other end tab (d) may also taper down to a smaller width (e.g., tapering down to a width of between ½ inch to 1½ inches) and then continue at this reduced width to form an elongated rectangular strip of varying lengths (e.g., between 4 and 10 inches), before again tapering back out to the same width at which the taper first began. Preferably, all such tapering will occur over an approximately 1 inch distance from the end of the elongated rectangular strip, though different approaches are also possible (including approaches which remove the tapering all together and simply transition from the width of the elongated strip to the width of the smaller width of the tab). You will note in FIG. 2 that although the front body main section design is different from the front main body section designs of FIG. 1 and FIG. 3, it still includes the same type of end tabs (c) and (d), though other types of end tabs (e.g., rectangular end tabs such as shown in FIG. 14) are also possible.

There are a variety of different ways a front section may be configured to form the main body of the neckwear. FIGS. 1, 2 and 3 are only provided as examples of numerous options.

A back section or sections of material or materials (if required), attached together and which may in some designs form the same shape and size as the main body of the front section without the tapered ends, herein referred to as the main body back section.

FIG. 4 depicts the corresponding back section for FIG. 1, and FIG. 5 represents the corresponding back section for FIG. 2. The main body back section depicted in FIG. 4 is made of two different materials sewn together, vinyl (a) and canvas (b) just as its corresponding main body front section FIG. 1 is. Other corresponding back sections may or may not resemble their corresponding front section.

If the material used in the neckwear design for the main body sections frays at its ends when cut, such as cotton or polyester or canvas, then the fray able ends in some designs may have ¼" turned over on each side such that a hem is formed. FIG. 6 shows an example of the top canvas part of the main body front section from FIG. 4 being hemmed (f) across the top since this section is made from canvas which will fray at the edges when cut.

For this design example, the neckwear is assembled by first laying the main body front section face down and placing the wrong side of the main body back section on top as depicted in FIG. 7. FIG. 8 shows an example of how a main body front section could be connected if it were designed without a corresponding main body back section. For either design, the end tabs on each side of the main body front section are then folded exactly in half as depicted in FIG. 9, with the folded half on top such that the tapered end tabs are completely aligned over each other. One method for attaching a front section to a back section when a back section is required is to sew around the end tab on one side, across the bottom of the neckwear, around the end tab of the second side, then across the top, thus forming the neckwear as depicted in FIG. 10. When assembled the main body section or sections are only attached to each other along the top and/or bottom of the main body section and not across the longitudinal sides, such that a type of sleeve (g) is created on the backside of the neckwear. Fastening tape, a magnetic strip or some kind of closing mechanism is attached on the end tabs; first on the back side of the shorter tab as depicted in FIG. 10 (h) and secondly on the top side of the elongated rectangular strip end as depicted in FIG. 11 (i), though attachment of a closing mechanism on the front of the shorter tab, the bottom of the rectangular strip, or on both sides of both the tab and the rectangular strip are also possible. As shown in FIG. 11, where a closing mechanism such as fastening tape or a magnetic strip is used, it will preferably be attached along the entire horizontal length (which will preferably between 2 and 5 inches) of the longer end tab.

The material disclosed herein is intended to be illustrative and not limiting. Examples of other variations on the disclosed technology might be a back section that is a series of loops through which a standard pet collar can be inserted rather than a solid sleeve, in the same manner as a belt is inserted on a pair of slacks. Or the back section may not resemble the front section at all, unlike the above examples. Or there may not be a back section at all as the front section would simply connect to itself to form a type of sleeve. Or, the fastening mechanism could be buckles or other structures, though fastening tape or magnetic strips are presently the preferred type of fastening. Or the steps required to assemble the neckwear may differ greatly depending on the requirements of the specific design being created. There are many ways to attach the sections together and there are numerous types of materials that can be used to construct such apparel, and there are an infinite number of designs that may be created based on this technology.

When this example of neckwear is used as a type of collar cover, the neckwear is attached to a standard pet collar by simply slipping the pet collar through the sleeve that is formed by connecting the front section to itself or to a corresponding back section. As depicted in FIGS. 12 and 13. The pet collar is then fastened on the pet. For more detail to be shown, FIG. 14 shows the pet collar being fastened without the pet. The pet collar itself is first connected (j) (clasp type connector shown). The end tabs of the neckwear are then attached over the collar buckle or clasp by sliding the elongated rectangular strip of the one end tab through the leash hook on the collar k), and then attaching the short tapered end tab on top (l) of the elongated rectangular end tab via the connecting mechanism, at any position along the tab that is preferred by the owner. FIG. 15 shows a back view of the neckwear fully connected with the leash hook exposed. FIG. 16 shows the front view. When this neckwear is used by itself as fashionwear without a collar underneath, or when it is positioned entirely on top of a standard collar, it is simply placed around the pet's neck and attached by placing the short tapered end on top of the elongated rectangular tab at any position preferred by the owner, thus allowing the closing mechanism to connect and hold it closed. FIG. 17 shows the neckwear on a dog.

For owners that have difficulty manipulating hooks or claps or snaps due to arthritis or other issues that may limit their dexterity this neckwear is very easy to connect. It allows owners such as these to easily change out their pet's appearance by simply fastening the neckwear on top of their pet's standard collar.

Although the present neckwear has been described in some detail by way of illustration and example for purpose of clarity of understanding, it is understood that certain changes and modifications may be made within the spirit of the invention.

I claim:

1. A method of applying an article of clothing configured to be worn over an existing pet collar, the article comprising (i) a front section with tapered ends with one of the tapered ends being more elongated than the other, (ii) a back section that forms a sleeve through which the existing pet collar can be slipped and substantially concealed, and (iii) complementary fasteners on each of the tapered ends of the article that expose a hook on the existing pet collar that is specifically designed to be attached to a leash while substantially covering the remainder of the existing pet collar, wherein the article is configured to substantially cover the existing pet collar's inside surface and exterior surface while completely encircling the existing pet collar's exterior surface, the method comprising:
  a) slipping the existing pet collar through the sleeve formed by the front and back sections of the article, leaving fastener ends of the existing pet collar protruding from the sleeve;
  b) threading one of the tapered ends of the article through the hook on the existing pet collar that is specifically designed to be attached to the leash;
  c) attaching the existing pet collar around the neck of the pet; and
  d) attaching one tapered end of the article on top of the second more elongated tapered end of the article using the fastener such that the article substantially conceals the existing pet collar underneath except for the hook on the existing pet collar that is specifically designed to be attached to the leash.

2. The method of claim 1, wherein the method comprises closing a quick release clasp on the existing pet collar around the pet's neck.

3. The method of claim 1, wherein the method comprises closing a buckle on the existing pet collar around the pet's neck.

* * * * *